United States Patent [19]

Wiseman

[11] Patent Number: 5,798,697
[45] Date of Patent: *Aug. 25, 1998

[54] EXHAUST/SUPPLY DIRECTION INDICATOR

[76] Inventor: Brian Wiseman, 95 Fairmount Ave., Saugus, Mass. 01906

[21] Appl. No.: 857,580

[*] Notice: The term of this patent shall not extend beyond the expiration date of Pat. No. 5,661,461.

[22] Filed: May 16, 1997

Related U.S. Application Data

[63] Continuation of Ser. No. 427,155, Dec. 5, 1994, Pat. No. 5,661,461, which is a continuation-in-part of Ser. No. 127,959, Sep. 28, 1993, Pat. No. 5,410,298, which is a continuation-in-part of Ser. No. 764,808, Sep. 24, 1991, Pat. No. 5,291,182.

[51] Int. Cl.$^6$ ...................................... G08B 21/00
[52] U.S. Cl. .................. 340/610; 340/606; 116/112; 116/264; 116/273; 200/81.9 R; 307/118; 454/256
[58] Field of Search .................. 340/606, 610; 116/112, 264, 273; 200/81.9 R; 307/118; 454/256

[56] References Cited

U.S. PATENT DOCUMENTS

| | | | |
|---|---|---|---|
| 4,486,744 | 12/1984 | Pratt et al. | 340/606 |
| 4,906,807 | 3/1990 | Siebert et al. | 340/610 |
| 5,142,271 | 8/1992 | Bailey et al. | 340/606 |
| 5,183,983 | 2/1993 | Knop | 200/81.9 M |
| 5,291,182 | 3/1994 | Wiseman | 340/610 |
| 5,410,298 | 4/1995 | Wiseman | 340/610 |
| 5,661,461 | 8/1997 | Wiseman | 340/610 |

*Primary Examiner*—Edward Lefkowitz
*Attorney, Agent, or Firm*—Wolf, Greenfield & Sacks, P.C.

[57] ABSTRACT

An apparatus for detecting the flow direction of a fluid from an apparatus or between two apparatuses such as a biohoods, fume cabinets, or filters. The device includes a conduit horizontal plane and adapted to receive the fluid. A detecting element is disposed within the conduit and is movable in the direction of fluid flow, the detecting element being in direct contact with the fluid. A sensing element may be coupled to the conduit for determining when the detecting element reaches a predetermined position within the conduit. The circuitry coupled to the sensing element enables selection of a desired flow direction and actuates an alarm when the detected flow direction is other than the one selected.

10 Claims, 12 Drawing Sheets

EXHAUST/SUPPLY DIRECTION INDICATOR

This application is a continuation of application Ser. No. 08/427,155, filed Dec. 5, 1994, entitled EXHAUST/SUPPLY DIRECTION INDICATOR, now U.S. Pat. No. 5,661,461, which is a continuation-in-part of Ser. No. 08/127,959, filed Sep. 28, 1993, now U.S. Pat. No. 5,410,298, dated Apr. 25, 1995; which is a continuation-in-part of Ser. No. 07/764,808, filed Sep. 24, 1991, now U.S. Pat. No. 5,291,182, dated Mar. 1, 1994.

FIELD OF THE INVENTION

This invention relates to devices for detecting the directional flow of exhaust or supply air into or out of an enclosure or the differential air pressure or direction between two apparatuses.

BACKGROUND OF THE INVENTION

The direction of air flow into or out of a room depends on the pressure of the room relative to its adjacent spaces. The differential pressure between the room and the adjacent spaces need only be slight, practically immeasurable, to create air flow. Rooms such as hospital operating rooms, patient isolation rooms, sterilization rooms, research laboratories, clean rooms, etc., often require directional air flow. For example, a patient isolation room, containing a patient who is susceptible to infection, is supplied with highly filtered air under positive pressure, i.e., clean air flows out of the room at all times, thereby preventing dirty or infectious air from entering the room. This is accomplished by supplying clean air to the patient's room at a greater flow rate than the rate at which air is exhausted from the room. Conversely, if the patient is infectious or the room contains toxins, the room should be kept under negative pressure, i.e., the rate at which potentially contaminated air is exhausted from the room is greater than the rate at which new air is supplied to the room.

In the above described environments, it is important that the proper direction of air flow be maintained. If the proper direction or air flow ceases, a detecting element should indicate the improper situation. In some instances, an alarm may be activated until the pressure condition in the room can be corrected.

Transducers are currently available that measure the differential pressure between a room and reference space and use of the resulting measurement for alarm actuation. A problem associated with these types of differential pressure sensors is that the room must be well sealed or "tight" in order to build up a measurable pressure. When a door or window is open for an appreciable period of time, the differential pressure of the room approaches zero causing the sensor to falsely actuate the alarm, despite the presence of directional air flow into or out of the room. Accordingly, there is a need for a device which can detect the directional air flow into or out of a room without relying on differential pressure measurements.

Another type of transducer currently available utilizes a "hot wire" anenometer to detect the directional velocity of air. Such transducers are an improvement over a differential pressure transducer. However, their accuracy is dependent upon the sensitivity and proper calibration of the transduction element and the associated processing circuitry.

Further, since neither air pressure nor air velocity can be seen, people often hang a piece of string or tissue in a doorway or in front of a vent to assess the direction of air flow into or out of a room and to verify the results of either differential pressure or anenometer-type transducer.

U.S. Pat. Nos. 2,808,580, Fuller; 3,192,470, Wadey; 3,689,908, Ray; 3,820,396, Garner et al.; 4,486,744, Pratt et al.; 4,774,676, Stenzel et al.; and 4,963,857, Sackett; all disclose devices for detecting the presence and velocity of a fluid, typically a gas. However, none of these references disclose a device which allows the desired flow direction of a fluid to be selected and which actuates an alarm when the detected direction is other than the desired direction. Accordingly, there exists a need for a device which allows the desired direction of air flow to be selected and visually monitored, and/or, which actuates an alarm when the detected direction is other than the one selected.

In addition, there exists a need to detect the air direction flow within an air supply or exhaust apparatus.

It is therefore an object of this invention to provide a device for detecting the presence and direction of air flow between two rooms or a room and its adjoining spaces.

Another object of the present invention is to provide a device which allows the desired direction of air flow to be selected.

A further object of the present invention is to provide a device which indicates when the detected direction of air flow is different from the selected direction of air flow.

Still another object of the present invention is to provide a device for detecting the presence and direction of air flow between a room and its adjoining spaces which does not require that the room be well sealed, i.e., at near zero differential pressure.

A further object of the present invention is to provide a device for detecting the presence and direction of air flow whose accuracy does not depend primarily on the sensitivity and calibration of the transducer and associated processing circuitry.

Yet another object of the present invention is to provide a device for detecting presence and direction of air flow which allows for direct visual confirmation of the direction of air flow.

Another object of the present invention is to provide a device for detecting the direction or air flow within an air supply or exhaust apparatus.

BRIEF SUMMARY OF THE INVENTION

The foregoing and other objects of the present invention are achieved with an apparatus for detecting the flow direction of a fluid comprising a conduit adapted to receive the fluid. A detecting element is disposed within the conduit and is movable in the direction of fluid flow. A sensing element may be coupled to the conduit to determine when the detecting element reaches a predetermined position within the conduit.

In one embodiment of the present invention, the conduit comprises a cylindrical tube extending along a horizontal plane. The moving element comprises a lightweight sphere disposed within the tube and translatable in the direction of fluid flow. In this embodiment, the sensing element comprises a pair of optical sensors disposed at opposite ends on the tube and within the path of the sphere.

In another embodiment, the conduit comprises a rectangularly shaped tube having a rectangular bore. The moving element comprises a flap pivotally coupled to the rectangular bore and deflectable in the direction of fluid flow. In this embodiment, the sensing element comprises a pair of optical sensors symmetrically positioned about the flap when undeflected.

In still another embodiment a circuit, coupled to the sensing element, indicates the direction of fluid flow through the conduit. The circuit includes elements for selecting the desired direction of the fluid flow and means for indicating when the detected flow direction is other than the one selected and for actuating an alarm when the detected direction is other than the one selected.

In another series of embodiments of the present invention, a single sphere or pair of spheres may be used to provide a visual indication of the direction of the fluid flow. Moreover, the tube along which the sphere or spheres move may be straight, concave, or disposed at an angle relative to the wall.

In still another embodiment, the conduit may have small inlet/outlet openings to mitigate or eliminate harmful fluids from flowing through the system in an undesired direction.

In another embodiment, the conduit may be in fluid communication with an exhaust duct or supply source to indicate the status of the air direction in that apparatus or between two machines or between a machine and a filter.

The invention will be more fully understood from the detailed description set forth below, which should be read in conjunction with the accompanying drawings. The invention is defined in the claims appended at the end of the detailed description, which is offered by way of example only.

DETAILED DESCRIPTION

Figure 1:
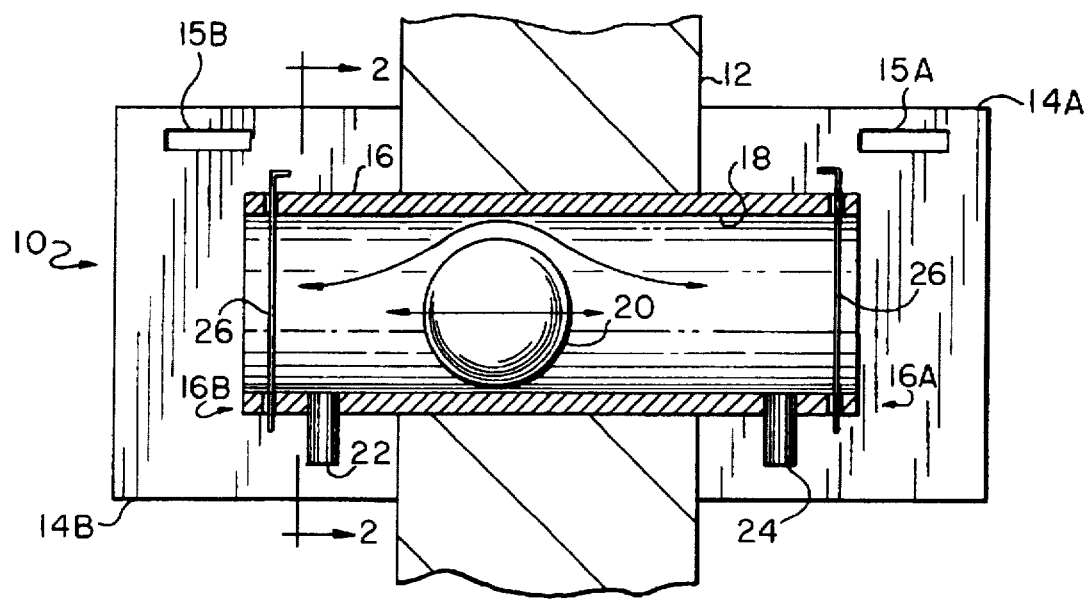
FIG. 1 is a side cut-away view of an air flow detector in accordance with a first embodiment of the present invention.

Referring now to the drawings, particularly FIGS. 1–5B, there is shown an air flow direction detector 10 in accordance with a first embodiment of the present invention. In the illustrative embodiment, detector 10 extends transversely through a wall 12 or similar structure separating two rooms, such as hospital rooms, or a room and its adjoining enclosures. A room is considered to be any substantially enclosed space, although not necessarily a sealed or "tight" space. Detector 10 comprises housing sections 14A–B, tube 16, sphere 20, sensors 22 and 24, stop pins 26, control panel 78 and electrical circuits 30 and 60.

In the first embodiment of the present invention, tube 16 is an elongate cylinder having open ends 16A–B, as shown in FIG. 1. Tube 16 may have a length of approximately 8 inches. A bore 18 extends through tube 16. Bore 18 has a uniform diameter of approximately 1½ inches and a smooth surface to minimize the resistance between itself and sphere 20, as explained hereinafter. Tube 16 is formed from a rigid material, typically plastic, and may be transparent, translucent or opaque. Tube 16 extends through wall 12 along a horizontal level plane to avoid biasing the motion of sphere 20 in either direction as it moves through bore 18. A pair of stop pins 26 extend through apertures in the wall of tube 16 and across the diameter of bore 18. Stop pins 26 prevent sphere 20 from exiting open ends 16A–B of tube 16 while still allowing unrestricted air flow through bore 18 diameter.

Sphere 20 is disposed in bore 18 of tube 16, as shown in FIGS. 1–4. Sphere 20 may be formed of a lightweight material, such as plastic, and may have a hollow interior, similar to a ping-pong ball. The exterior surface of sphere 20 is smooth to minimize friction between itself and bore 18, allowing the sphere to traverse bore 18 in the presence of minimal air flow. The diameter of sphere 20 is approximately 80% of the diameter of bore 18.

Sensors 22 and 24 extend through the wall of tube 16 and are exposed to the interior of bore 18. The end surfaces of sensors 22 and 24 are flush with the surface of bore 18 to prevent interference with the motion of sphere 20 through the bore. Sensor 22 is located outside the room being controlled for proper pressurization and sensor 24 is located inside the room. Sensors 22 and 24 are coupled to circuits 30 and 60 and detect the presence of sphere 20, as explained hereinafter.

Figure 4:
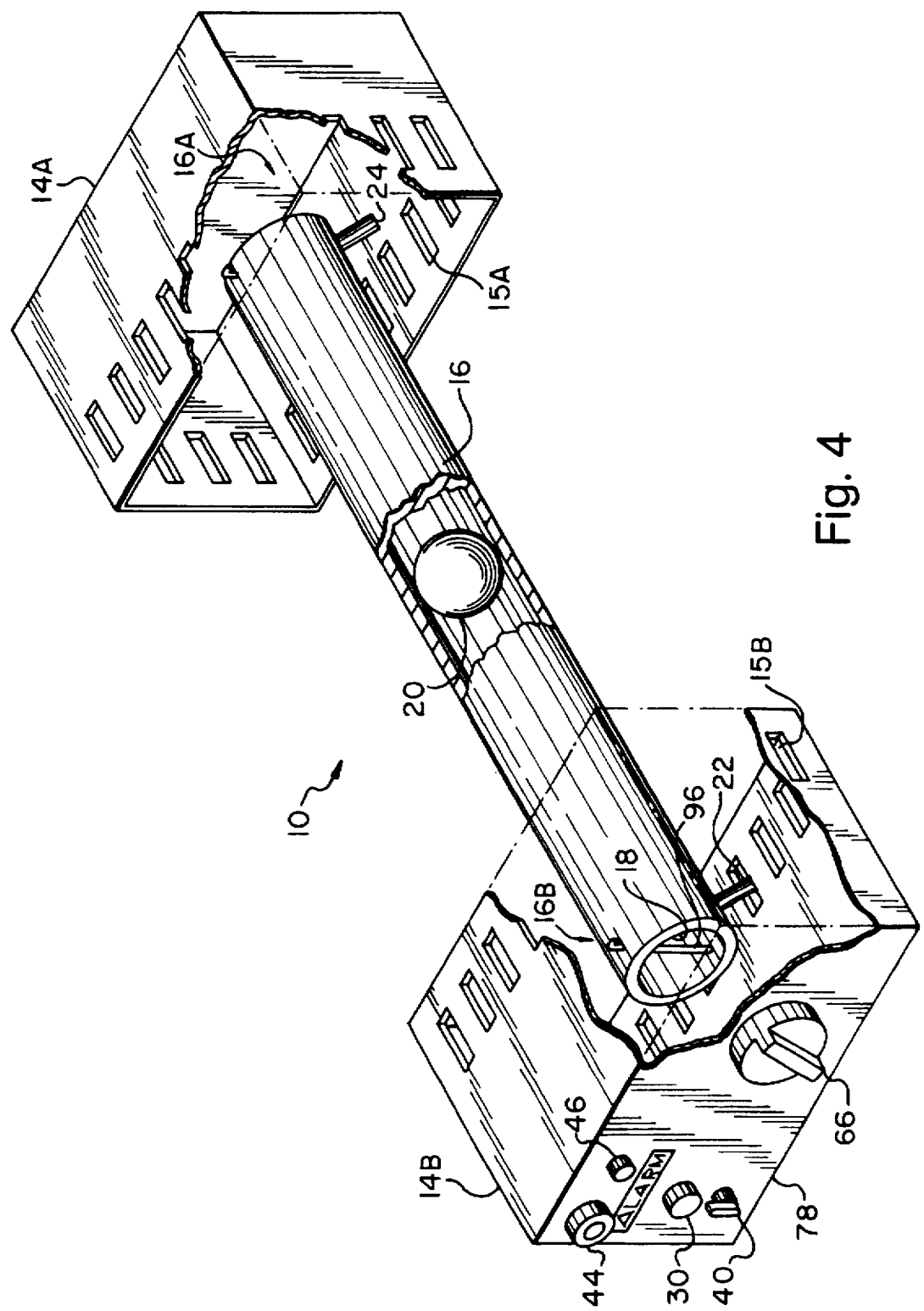
FIG. 4 is a perspective view of the air flow detector of FIG. 1.

Referring to FIGS. 1 and 4, end 16A of tube 16 projects from wall 12 into the room or enclosure in which the pressure is to be monitored. A substantially rectangular housing section 14A, shown transparent for purposes of viewing the position of sphere 20, surrounds end 16A and contains one or more apertures 15A which provide fluid communication between the room interior and tube 16. Housing section 14B, similar in construction to section 14A, surrounds end 16B of tube 16 where it protrudes from the opposite side of wall 12, as illustrated in FIG. 1. Control panel 78 is integrated to the front surface of housing section 14B to allow for visually monitoring the position of sphere 20 directly, the position of sphere 20 via LED 52 and LED 58, the status of an alarm condition and for changing the desired direction of air flow via switch 66. Control panel 78 can be located inside or outside the room being monitored. The room being monitored preferably has active supply and exhaust vents, i.e., fans are present in both vents.

Figure 5B:
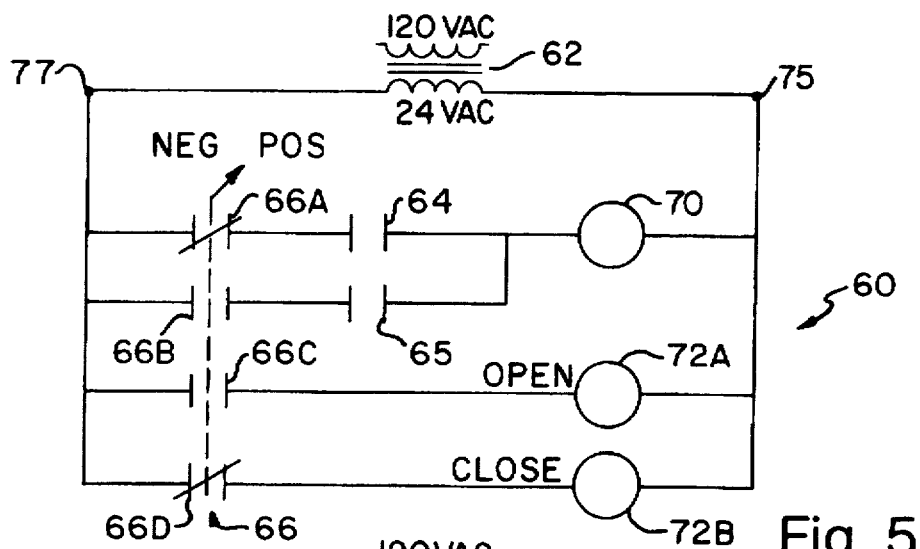
FIGS. 5A-B are electrical schematics of the circuitry of the air flow detector in accordance with the present invention.
Figure 5A:
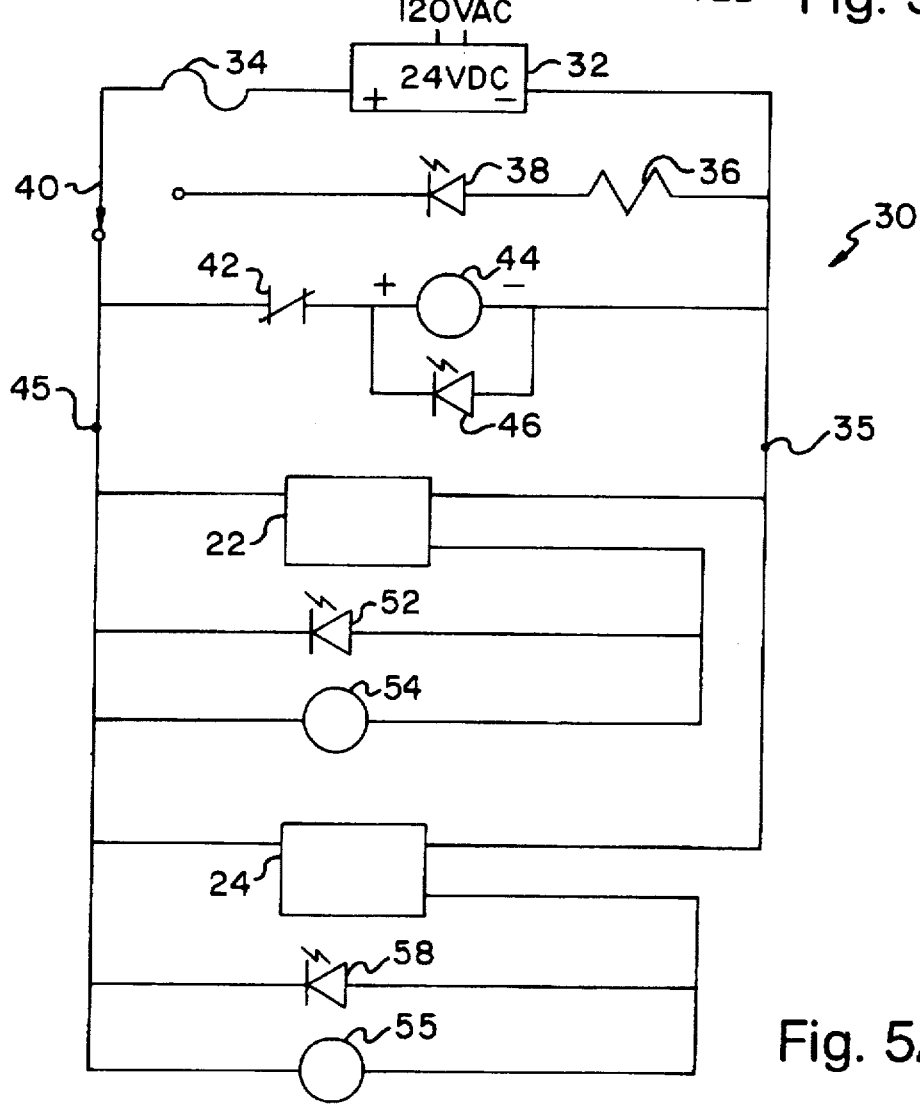

Referring to FIGS. 5A–B, the electrical circuits of air flow detector 10 are illustrated. Circuit 30 of FIG. 5A is a direct current circuit and includes a power supply 32 for converting a standard 120 volt AC line input into a 24 volt DC output. The positive terminal of power supply 32 is connected to the contact of a single-pole, double-throw (SPDT) switch 40 through a fuse 34. A first terminal of switch 40 is connected to a terminal of Light Emitting Diode (LED) 38, which may be a blinking-type LED. The other terminal of LED 38 is connected to the negative terminal of power supply 32 through a resistor 36. A second terminal of switch 40, hereinafter referred to as node 45, is connected to a first terminal of relay contact 42 of time delay relay coil 70 of circuit 60, as explained hereinafter. Relay contact 42 is normally in a closed position when relay coil 70 is not energized. A piezoelectric horn 44 and a light emitting diode 46 are connected in parallel between the second terminal of relay contact 42 and the negative terminal of power supply 32, hereinafter referred to as node 35. LED 46 may be red in color to indicate an alarm condition.

Figure 2:
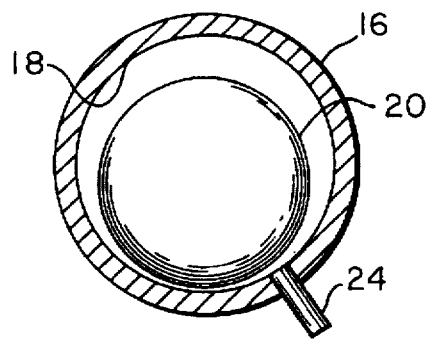
FIG. 2 is a cross-sectional view of the air flow detector of FIG. 1 as seen on line 2—2.

Sensors 22 and 24 are implemented, in the illustrative embodiment, with photoelectric diffuse sensors. Each of the photoelectric diffuse sensors includes an emitter and a receiver element in the same housing. The emitter sends out a beam of pulsed, infrared light which is reflected directly by sphere 20. When the beam hits the surface of sphere 20, it is diffused or scattered in all directions, with some of the light being reflected back to the receiver element of the sensor. The operating range of sensors 22 and 24 is dependent largely on the reflective properties of the surface of sphere 20. Each of the sensors includes a fiber optic cable adapter which is mounted through the wall of tube 16 and exposed to the interior of bore 18, as illustrated in FIGS. 1–2 and 4. A photoelectric diffuse sensor suitable for use as sensors 22 and 24 in the present invention is Model No. FZAN 18N 1005 commercially available from Baumer Electric, Southington, Conn. 06489.

Sensors 22 and 24 are three-terminal devices, illustrated in FIG. 5A. A first terminal of sensor 22 is connected to node 45 while a second terminal thereof is connected to node 35. An LED 52 and first relay coil 54 are connected in parallel between node 45 and the third terminal of sensor 22. In the illustrative embodiment, LED 52 is green for indicating positive pressure, i.e., directional airflow is out of the subject room. Sensor 24 similarly has a first terminal connected to node 45 and a second terminal connected to node 35. An LED 58 and second relay coil 55 are connected in parallel between node 45 and the third terminal of sensor 24. In the illustrative embodiment, LED 58 is yellow for indicating negative pressure, i.e., directional airflow is into the subject room. DC circuit 30 is electrically isolated from AC circuit 60 but is mechanically coupled therewith by relay contacts 42, 64 and 65, as explained hereinafter.

As shown in FIG. 5B, AC circuit 60 includes a transformer 62 which transforms a 120 volt AC line voltage to 24 volts AC. One terminal of transformer 62, hereinafter referred to as node 77, is connected to a first terminal of each of contacts 66A–D of two-position rotary switch 66. Switch 66 is a double-pole, double-throw (DPDT) switch in which contacts 66A and 66D are closed when the switch is in the positive position, as illustrated in FIG. 5B. Contacts 66B–C are closed when switch 66 is in the negative position. The second terminal of contact 66A of switch 66 is connected to a first terminal of relay contact 64 of relay coil 54. The second terminal of contact 64 is connected to a first terminal of time delay relay coil 70. The second terminal of relay coil 70 is connected to a second terminal of transformer 62, hereinafter referred to a node 75. The second terminal of contact 66B of switch 66 is connected to a first terminal of relay contact 65 of second relay coil 55. The second terminal of relay contact 65 is connected to the first terminal time delay relay coil 70. As shown in FIG. 5B, relay contacts 64 and 65 are normally in an open position when relays 54 and 55 are not energized, respectively.

A second terminal of contact 66C is connected to a terminal of first (open) winding 72A of an exhaust damper motor (not shown) which is used to open or close a damper over an active exhaust vent of the room being monitored. A second terminal of the motor winding 72A is connected to node 75. The second terminal of contact 66D of switch 66 is connected to a terminal of a second (close) winding 72B of the exhaust damper motor. A second terminal of winding 72B is connected to node 75.

Figure 3:
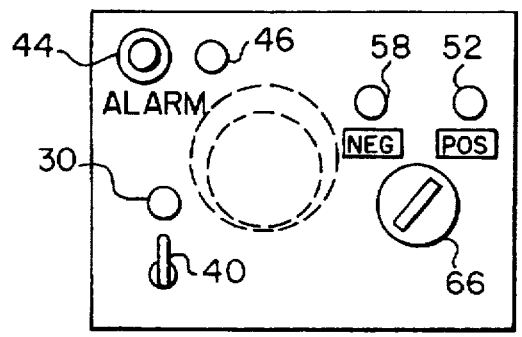
FIG. 3 is a front view of the control panel of the air flow detector of FIG. 1.

Control panel 78 of air flow detector 10 is illustrated in FIG. 3. Switches 40 and 66, LEDs 30, 46, 52 and 58, and alarm 44 are mounted on control panel 78 to select and indicate the selected mode and status of detector 10, as explained hereinafter. Some of the elements of circuits 30 and 60 may be mounted on a circuit board disposed behind control panel 78 which is formed integrally within the front surface of housing section 14B. Others, particularly power supply 32, transformer 62, and relays 54 and 55, may be located in a separate housing which is located remotely from detector 10 but which is electrically coupled to control panel 78.

The operation of detector 10 occurs as follows. The following initial powering of the circuits 30 and 60, the position of switch 66 is set to select the desired pressure conditions, i.e., the direction of air flow into or out of the room of concern. For the purposes of illustration, switch 66 is set to the positive position, as indicated in FIG. 5B, indicating that the room is to be under positive pressure. In this mode, the desired direction of air flow is out of the room. Assuming that the room is currently under positive pressure, air will enter housing section 14A and flow through bore 18 of tube 16. The flow of air through bore 18 will overcome any rolling friction between sphere 20 and bore 18 and translate sphere 20 in the direction of sensor 22. Stop pin 26 will prevent sphere 20 from exiting tube end 16B and will retain sphere 20 in the proximity of sensor 22.

Referring to FIG. 5A, in the positive mode, the contact of switch 40 is connected to node 45 which supplies current to sensor 22, LED 52 and relay coil 54. Light irradiated from the emitter element in sensor 22 is partially reflected off the surface of the sphere 20 and into the receiver element of sensor 22, activating the sensor. Upon activation of sensor 22, LED 52 and first relay coil 54 are operatively coupled to node 35. Current flows through LED 52 illuminating the LED and indicating that the room is under positive pressure. Current also flows through first relay coil 54, energizing the coil. Upon energization of first relay coil 54, contact 64 of circuit 60, which is normally open, closes. Time delay coil 70 is then coupled to node 77 via contact 66A and contact 64, causing coil 70 to be energized. Upon energization of coil 70, contact 42 of circuit 30, which is normally closed, opens, thereby preventing horn 44 and LED 46 from being activated as long as sphere 20 is positioned at sensor 22.

As shown in FIG. 5B, winding 72B of the exhaust damper motor is coupled to node 75 and to node 77 by contact 66D when switch 66 is in the positive position. Winding 72B remains energized, as long as switch 66 is in the positive position, and causes the exhaust damper motor to remain closed, regardless of the position of sphere 20 within tube 16. In this manner, the fan in the exhaust vent will not actively draw air from the room. Thus, the supply air must exfiltrate the room.

If the direction of air flow through tube 16 reverses, i.e., the room becomes negative pressurized while switch 66 is still set to a positive mode, the following occurs. The flow of air through bore 18 causes sphere 20 to move away from sensor 22 and toward sensor 24. As sphere 20 leaves the proximity of sensor 22, the sensor becomes deactivated, effectively stopping the flow of current through LED 52 and relay 54, causing LED 52 to turn off and contact 64 to open via deenergizing relay 54. Sphere 20 may continue to move through bore 18 until it is stopped by pin 26 near sensor 24 at end 16A of tube 16. In such case, sensor 24 is then activated, operatively coupling LED 58 and second relay coil 55 to node 35. Current flows through LED 58 from node 45 to node 35 illuminating the LED and indicating the room is under negative pressure. Current also flows from node 45 to node 35 through second relay coil 55 energizing the coil. Upon energization of second relay coil 55, contact 65 of circuit 60, which is normally open, closes. Time delay coil 70 is then coupled to contact 66B of switch 60. However, since contact 66B is normally open when switch 66 is in the positive position, coil 70 is not connected to node 77. Hence, the coil 70 will not energize and contact 42 of circuit 30 will remain closed, operatively coupling horn 44 and LED 46 to node 45, causing activation thereof. Horn 44 will sound an alarm and LED 46 will illuminate red indicating that the direction of air flow is other than the one selected, i.e., positive pressure. Alarm 44 and LED 46 will be activated whenever sphere 20 leaves the proximity of sensor 22, when switch 66 is in the positive position, regardless of whether sphere 20 is positioned over sensor 24 or is disposed intermediate sensors 22 and 24.

Brief changes in the position of sphere 20, i.e., minor fluctuations in room pressure, such as caused by opening or closing a door, are prevented from activating piezoelectric horn 44 and LED 46 by time delay relay coil 70 which requires a threshold period before energizing and activating such elements.

When the contact switch 40 is connected to LED 38, sensors 22 and 24 are deactivated, thereby preventing horn 44 and LED 46 from becoming active. In this configuration, current flows through LED 38 causing the LED to be illuminated, indicating that the alarm circuit 30 is essentially deactivated or "silenced".

From the above explanation, the theory of operation of detector 10 may be deduced for the situation in which switch 66 is positioned to select negative pressurization, i.e., the preferred direction of air flow is into the room. In this situation, horn 44 and LED 46 will be activated, indicating an alarm condition, whenever sphere 20 leaves the proximity of sensor 24. Also, when switch 66 is set to the negative position, open winding 72A of the exhaust damper motor will be activated, regardless of the position of sphere 20, thereby causing the fan in the exhaust vent to actively draw out more air than the air being supplied to the room by the supply vent. As a result, makeup air from outside of the room flows directionally into the room.

It will be obvious to those skilled in the art that sensors 22 and 24 may be implemented with other than photoelectric diffuse sensors. For instance, sensors 22 and 24 may be implemented with photoelectric reflective sensors or proximity sensors which are magnetically activated by the presence of a metal covered sphere. It will also be obvious that circuit 60 may be configured to control devices other than the exhaust damper motor of the illustrative embodiment.

Figure 6:
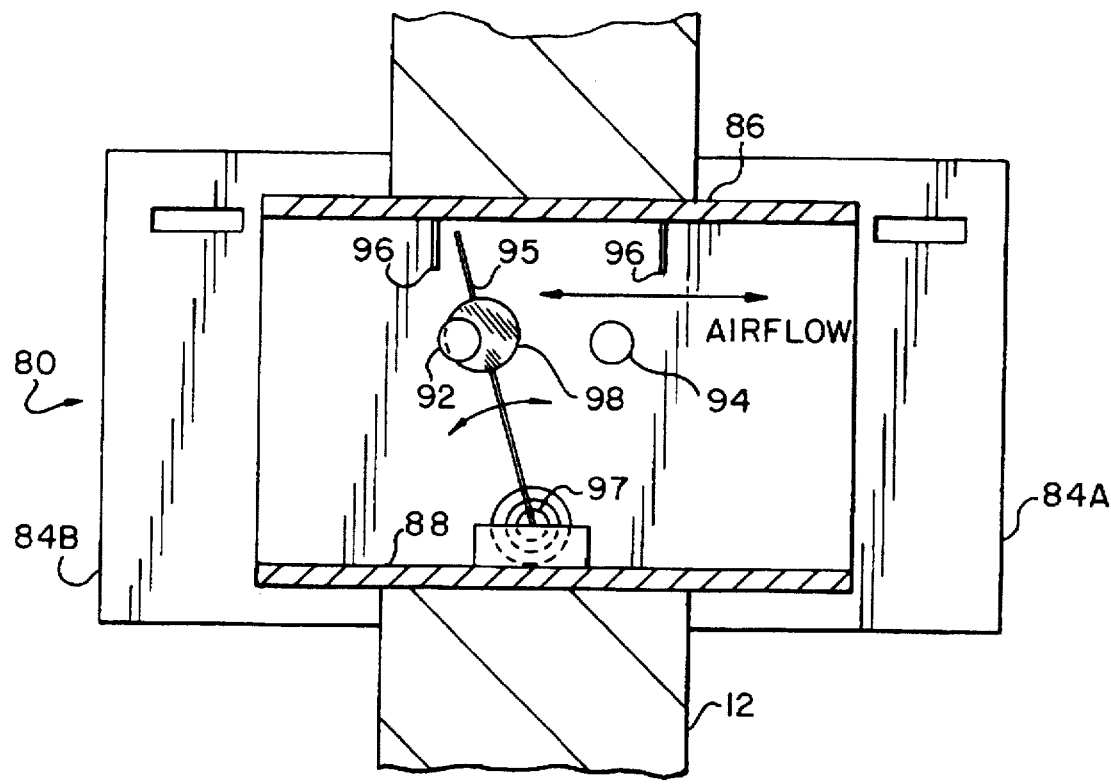
FIG. 6 is a side cut-away view of an air flow detector in accordance with a second embodiment of the present invention.
Figure 7:
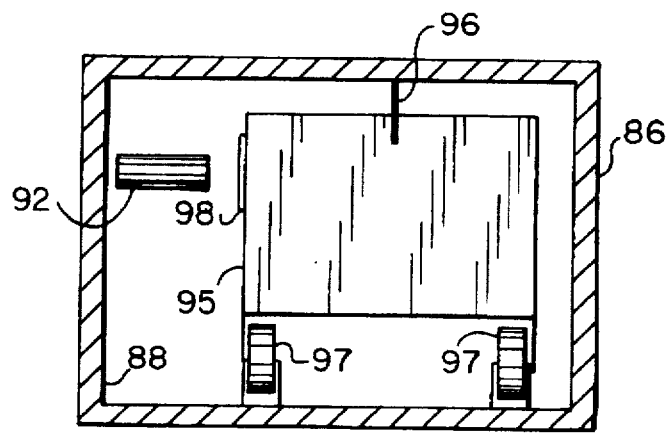
FIG. 7 is a front view of the air flow detector of FIG. 6.

Referring to FIGS. 6 and 7, an air flow direction detector 80, in accordance with a second embodiment of the present invention, comprises housing section 84A-B, conduit 86, sensors 92 and 94, stop pins 96 and circuits 30 and 60. Circuits 30 and 60 are identical to that of the first embodiment, except that sensors 22 and 24 are designed as sensors 92 and 94, respectively. Housing sections 84A-B are similar in shape and structure to housing sections 14A-B of detector 10, except for changes in dimension to accommodate conduit 86.

In the second embodiment, conduit 86 has a rectangular shape and may have a length of approximately 8 inches. A rectangular bore 88 extends through conduit 86 and may have a height of approximately 2 inches and a width of approximately 3 inches. Conduit 86 may be formed from a material similar to that of tube 16 of detector 10. A rectangular flap 95, formed from a thin, lightweight material, is movably coupled to bottom surface of bore 88 by a pair of downwardly extending legs, each of which is coupled to a spiral spring 97, as shown in FIGS. 6 and 7. Spiral springs 97 allow flap 95 to pivot freely in either direction through bore 88, without bias. A disc-shaped target 98 is secured to a side edge of flap 95. A pair of stop pins 96 project downwardly from the upper interior surface of the bore 88 and limit the total possible range of displacement of flap 95 to an approximately 30° arc.

Sensors 92 and 94 are mounted to an interior side surface of rectangular bore 88. Sensors 92 and 94 are positioned symmetrically about flap 95 in its upright, undeflected, position. When flap 95 is at its maximum deflection in either direction, and in contact with one of stop pins 96, target 98 covers and activates one of sensors 92 or 94, depending on the direction of air flow. In this manner, flap 95 and target 98 perform the same function as sphere 20 of detector 10.

The operation of air flow direction detector 80 is similar to that of detector 10. Air flows through bore 88, causing a deflection of flap 95 in the direction of air flow. When flap 95 reaches its maximum extent of travel, target 98 covers one of sensors 92 and 94 thereby activating that sensor. The interaction of sensors 92 and 94 with circuits 30 and 60 is identical to that previously explained with regard to sensors 22 and 24 of the first embodiment.

Figure 8:
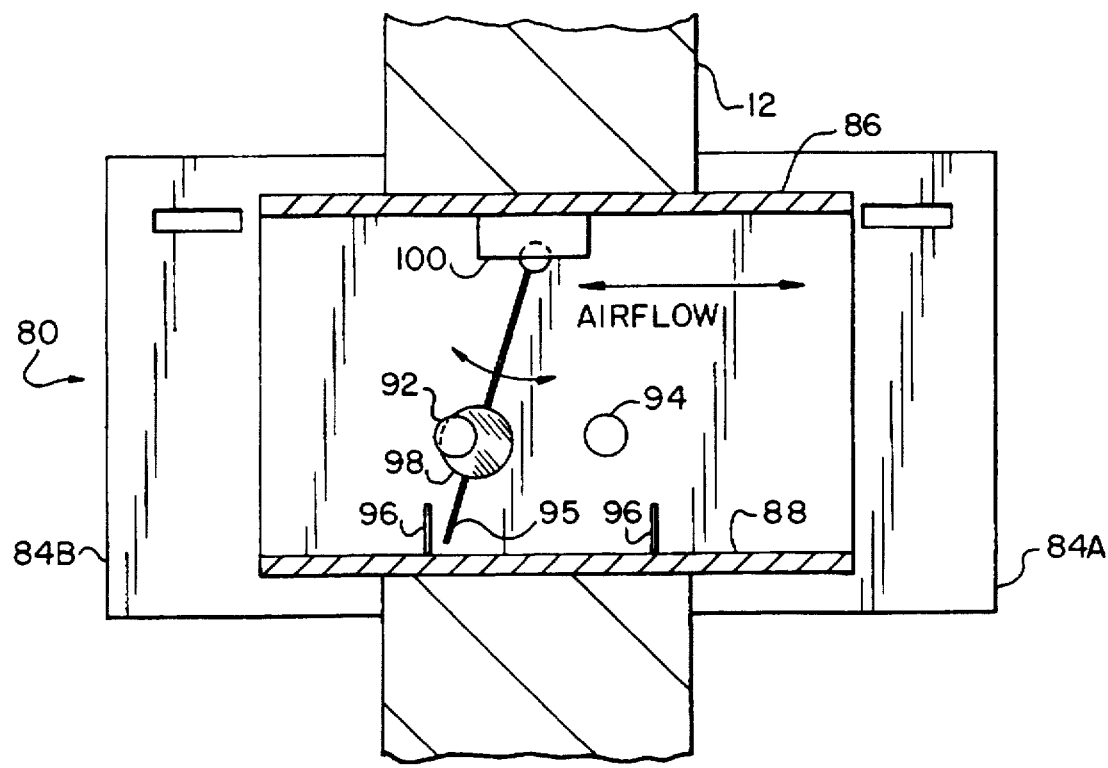
FIG. 8 is a side cut-away view of an alternate embodiment of the air flow detector of FIG. 6.
Figure 9:
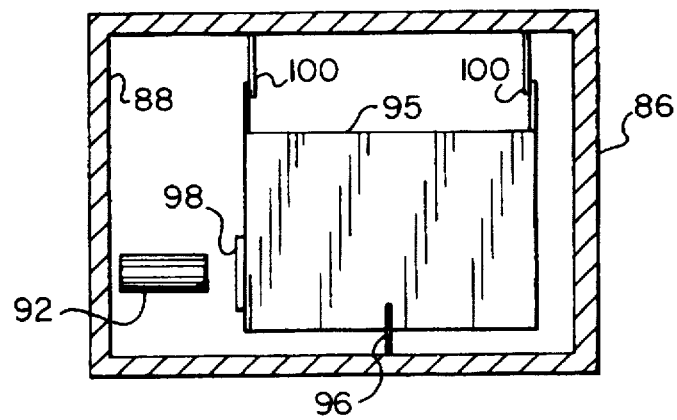
FIG. 9 is a front view of the air flow detector apparatus of FIG. 8.

Referring to FIGS. 8 and 9, an alternate embodiment of detector 80 is illustrated. In this alternative embodiment, flap 95 is pivotally coupled to the upper interior surface of bore 88 by a pair of supports 100. Sensors 92 and 94 are positioned lower on the interior side surface of bore 88 so as to similarly coact with flap 95 and target 98 as in the embodiment illustrated in FIGS. 6–7. Also, stop pins 96 project upwardly from the bottom surface of bore 88.

It may be appreciated from the foregoing explanation, that the illustrative embodiments of the present invention provide a device which allows the desired direction of air flow to be selected and visually monitored and which actuates an alarm, or similar device when the air flow direction detected by the device is other than the one selected.

Other embodiments of the present invention may be seen in FIGS. 10–18. Each of these embodiments is designed to permit visual monitoring of the detecting element. However, an alarm system of the type described above may also be used in conjunction with the embodiment.

Figure 10:
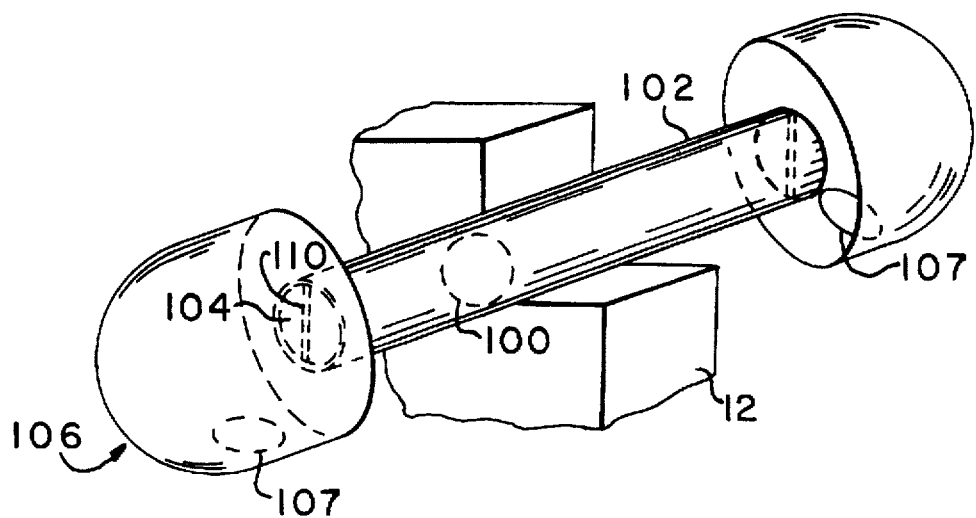
FIG. 10 is a perspective view of embodiments of the present invention secured within a wall.

FIG. 10 illustrates the basic embodiment comprising a sphere or detecting element 100 having a diameter slightly smaller than the inner diameter of the bore or conduit 102 in which it travels. At either end of the conduit 102, are the inlet/outlet openings 104 through which fluid passes in or out of the monitored area. Each inlet/outlet opening 104 may have an optional tamper-proof cover 106, having an opening 107, for protecting the device from damage or vandalism. Each cover 106 is made of durable hard plastic which is transparent to provide viewing of the inlet/outlet openings 104. Stop pins 110 proximal to either opening 104 limit movement of element 100 and retain it in the conduit.

Figure 11:
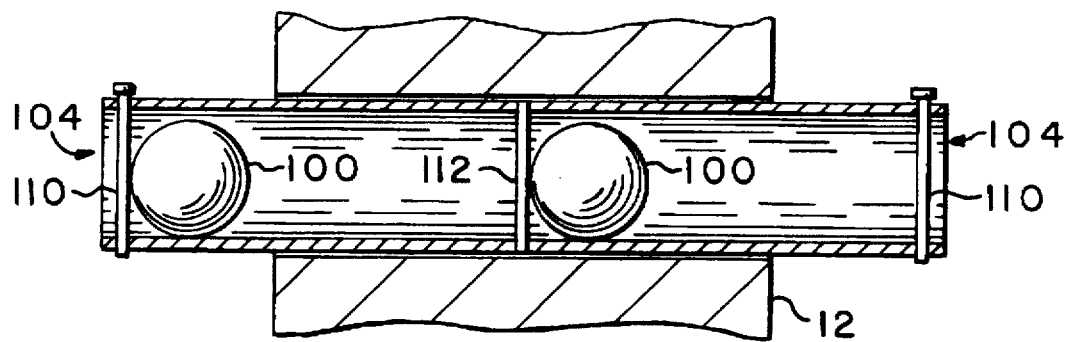
FIG. 11 is a side view of the two-sphere version of FIG. 10.

The embodiment of FIG. 10 is a one sphere system. It may be converted into a two sphere system as shown in FIG. 11. A second sphere 100 is placed within the conduit 102 and the two spheres 100 are separated by a intermediate pin 112. The intermediate pin 112 is preferably positioned half-way along the length of the conduit 102 and extends across the inner diameter of the conduit 102. The intermediate pin 112 is preferably coplanar with the stop pins 110.

In the two sphere system, each sphere 100 may be marked according to the intended use of the system. For example, one sphere may have an indicia signifying "good" (such as the word "good" or painted green), and the other sphere may have a "bad" indicia (such as "bad" or painted red or black). A two sphere system may be desirable to eliminate confusion as to the significance of a sphere locating at a particular opening 104. Also, such a system may be desired when personnel monitoring the system are frequently changed or even if there is a change in the type of environment being monitored. In some situations, it may be desired that the fluid flow from the room, while in other situations the opposite may be true. By interchanging the spheres, the same conduit 102 may be used to monitor different conditions. To accomplish this, the covers 106 and stop pins 110 are removed and the spheres are interchanged. The covers 106 may be locked to the conduit 102 to prevent undesired removal.

Figure 12:
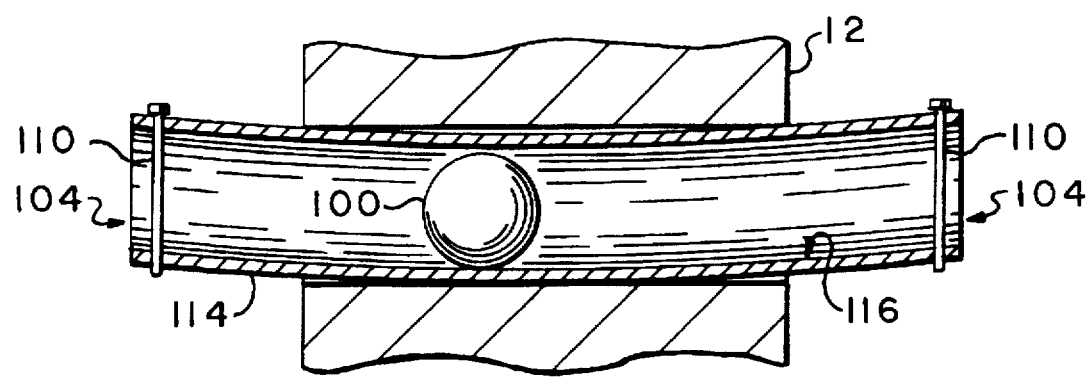
FIG. 12 is a side view of another embodiment of the present invention.
Figure 13:
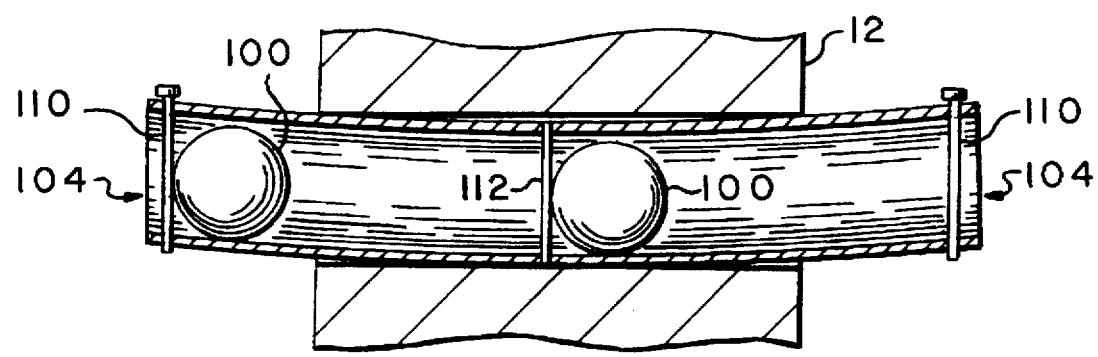
FIG. 13 is a side view of the two-sphere version of FIG. 12.

Another embodiment is illustrated in FIGS. 12 and 13. FIG. 13 is the two sphere version of FIG. 12. In this embodiment, the bore or conduit 114 is concave along its length. The sphere 100, or spheres of the two sphere system of FIG. 13, will rest at the bottom of the curve 116 when the direction of the fluid flow is either neutral or negligible. The amount of curve in the conduit 114 is dependent upon the use of the system. However, the system should indicate any fluid flow direction of significance to the monitored environment. Because of the use of concave conduit the force generated by moving air must be more than minimal to move the elements 100 to the outer ends. Thus, the system provides means by which minimum thresholds of air flow is required to effect a detection of movement.

In this embodiment, the adaptation to a two-sphere system is simple. Its advantages have been mentioned above with respect to the embodiment of FIG. 11. In the two sphere system of FIG. 13, however, the spheres will rest on opposite sides of the intermediate pin when the fluid direction is minimal or neutral.

Figure 14:
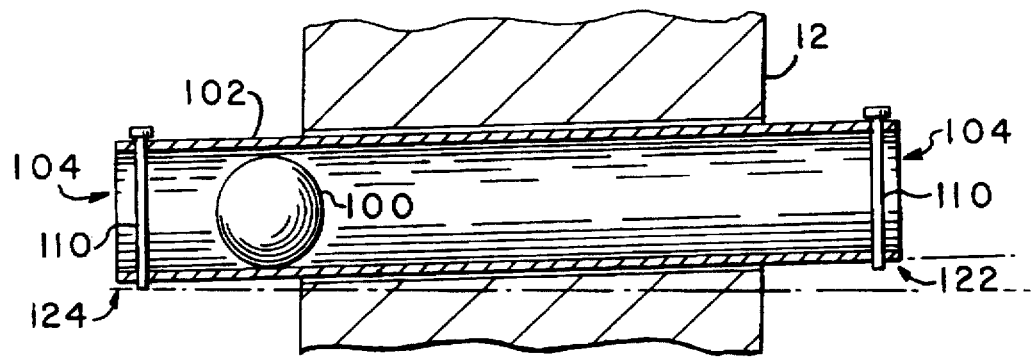
FIG. 14 is a side view of another embodiment of the present invention.
Figure 15:
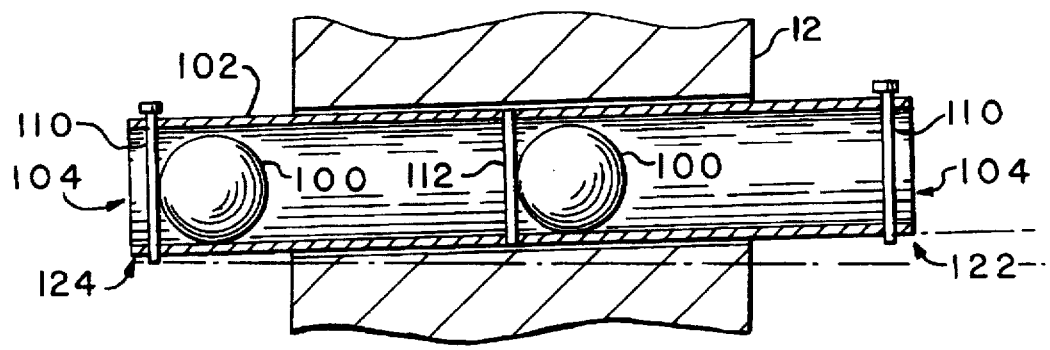
FIG. 15 is a side view of the two-sphere version of FIG. 14.

Still another embodiment of the present invention is illustrated in FIGS. 14 and 15. The only difference between this embodiment and the embodiment of FIGS. 10 and 11 is that the conduit 102 of the embodiment of FIGS. 14 and 15 is secured at an angle within the wall 12. The degree of the angle is dependent on the use of the system similar to the determining the desired curve of FIGS. 12 and 13.

The embodiment of FIGS. 14 and 15 is preferably set up such that the sphere is visible only at the higher inlet/outlet openings 104, labeled 122, when the desired condition is present. When the ball is located at the lower opening 104, labeled 124, the fluid is either neutral, minimal, or moving in the undesired direction.

Figure 16:
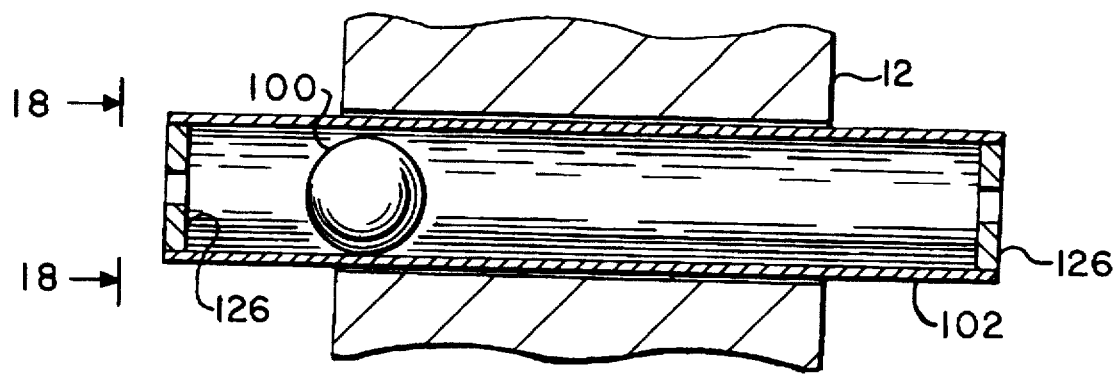
FIG. 16 is a side view of another embodiment of the present invention.
Figure 17:
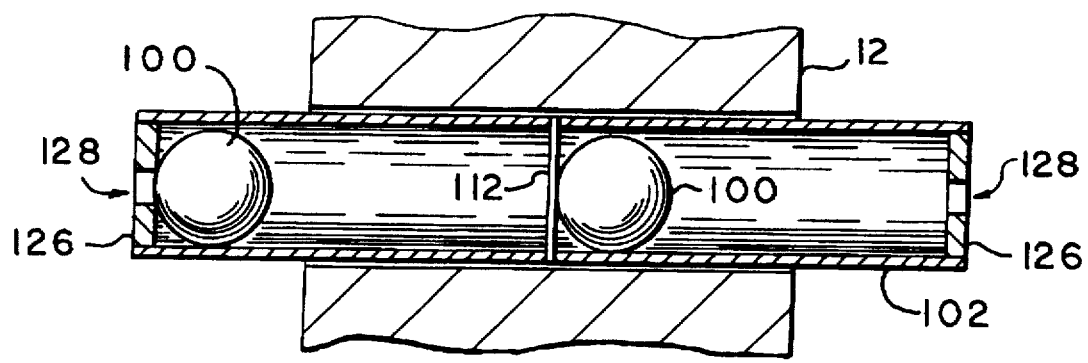
FIG. 17 is a side view of the two-sphere version of FIG. 16.
Figure 18:
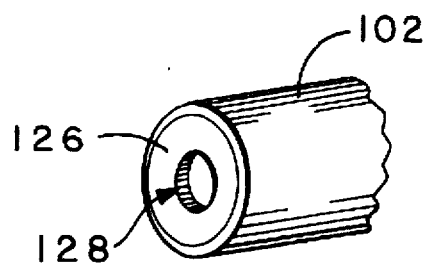
FIG. 18 is a perspective end view taken along the line 18—18 of FIG. 16.

When monitoring a detrimental, the stop pins 110 of the other embodiments may be replaced with disk-shaped caps 126 as shown in the embodiment of FIGS. 16–18. Each cap 126 has a fluid inlet/outlet opening 128 positioned such that the sphere 100, when located against the cap 126, inhibits contaminated fluid from escaping through the conduit 102. The location of the opening 128 through the cap 126 is dependent on the dimensions of the sphere 100 used to monitor the direction of the fluid flow. An end view of the cap 126 is illustrated in FIG. 18.

Many of the features of the embodiments may be combined as desired. For example, caps 126 may obviously be used in any of the previously mentioned embodiments. Also, each embodiment may have the optional tamper resistant covers and audio alarm in combination with the visual monitoring. In addition, other obvious variations to the present invention are considered part of the scope of the invention. For example, the conduit 102, while illustrated as having a circular cross-section, may just as simply have an oval or rectangular cross-section.

Figure 19:
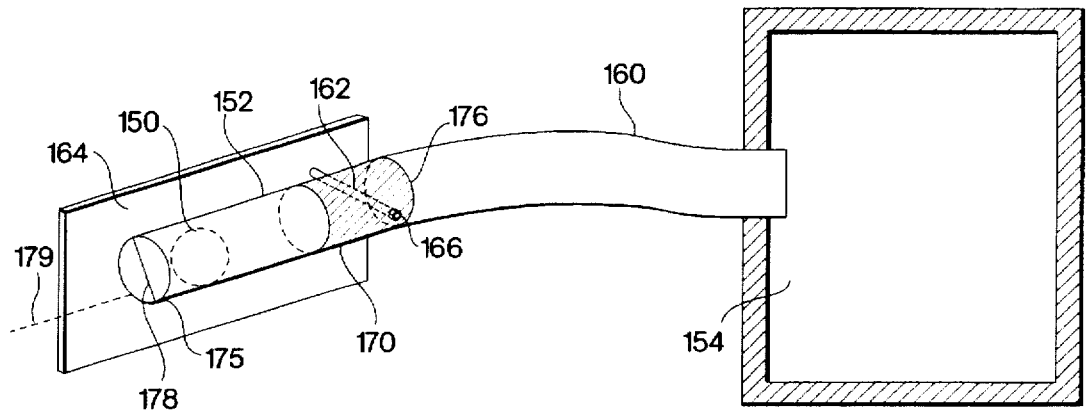
FIG. 19 is a perspective view of another embodiment of the present invention.
Figure 20:
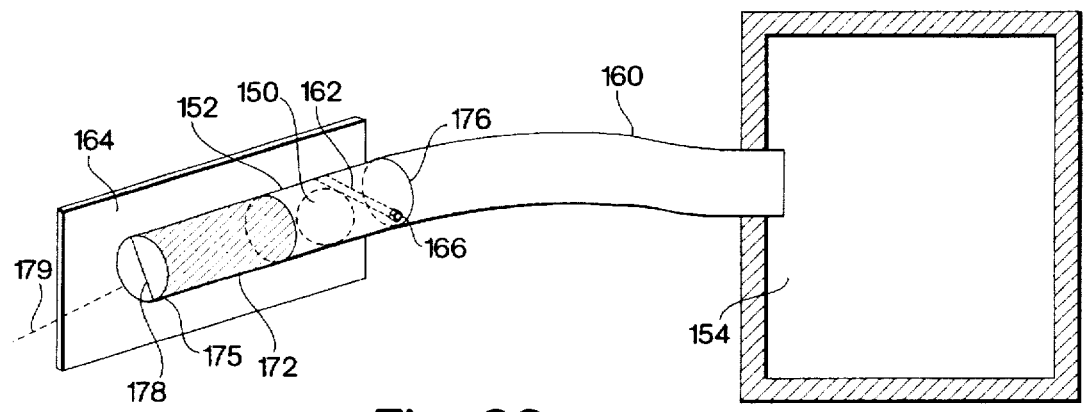
FIG. 20 is a perspective view of a similar version to the embodiment of FIG. 19.
Figure 21:
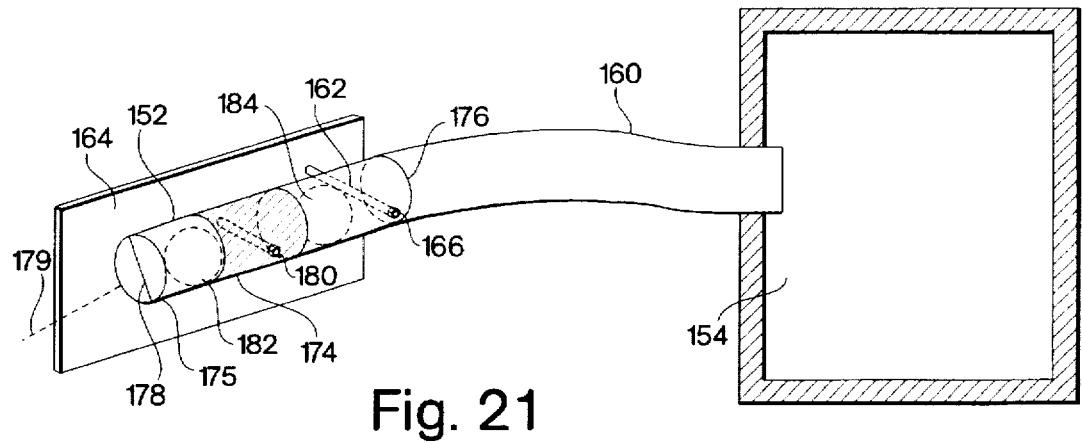
FIG. 21 is a perspective view of another version similar to the embodiment of FIG. 19.
Figure 22:
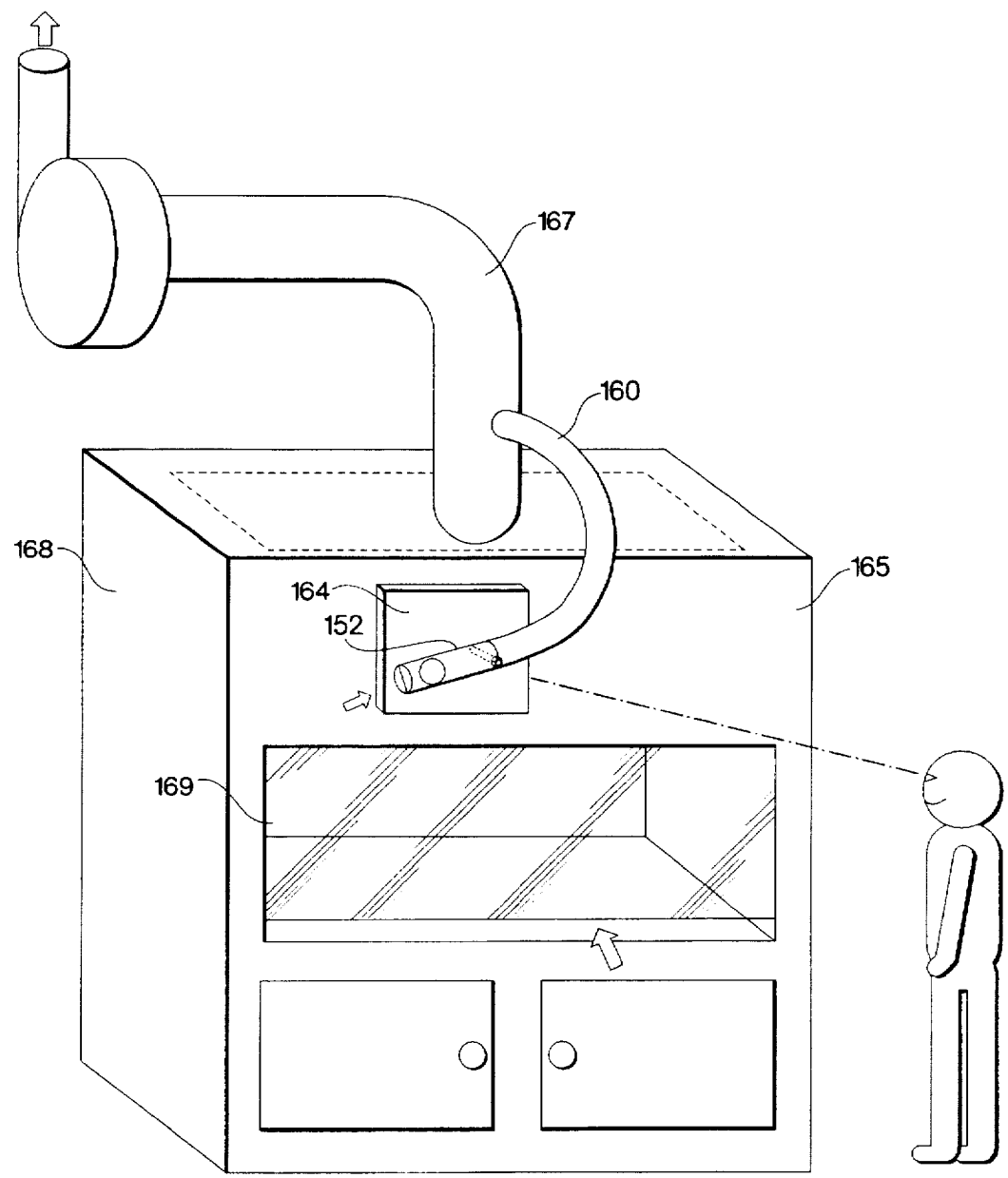
FIG. 22 is an illustration of the embodiment of FIG. 19 mounted for monitoring an exhaust system for a fume cabinet.
Figure 23:
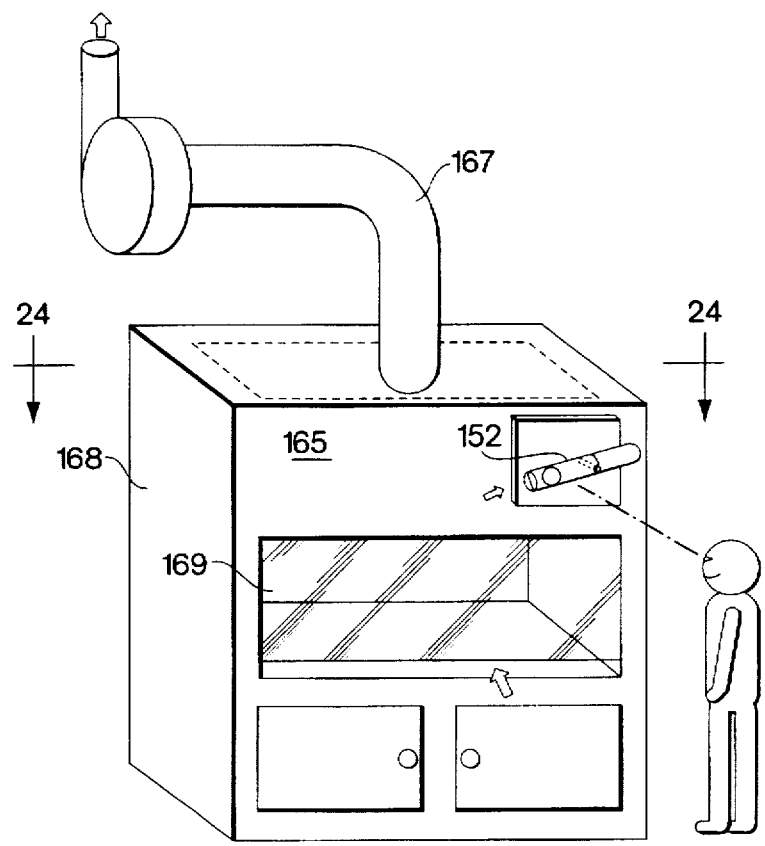
FIG. 23 is an illustration of the embodiment of FIG. 19 mounted for monitoring a fume cabinet.

Another embodiment of the present invention is illustrated in FIGS. 19–21. As illustrated in FIGS. 19 and 20 a single sphere 150 is located within a conduit 152. The conduit 152 is in fluid communication with an air exhaust/supply source 154 by means of an extension tube 160. In the embodiment illustrated, the extension tube 160 and conduit 152 may have the same diameter, and, in fact, may be formed from a single continuous tubing. Preferably, however, in typical settings such as a laboratory, the extension 160 must be flexible so that the conduit 152, which is rigid, may be mounted on a wall at approximate eye level (FIGS. 22 and 23).

The conduit 152 further has a forward pin 162. The pin 162 has several functions in addition to being a forward stop. For example, the pin 162, as shown, passes through the conduit 152 and into a fixed backplane 164 thereby securing the conduit 152 against the backplane 164. The backplane 164 itself may be mounted to a wall or onto the apparatus 165 (FIGS. 22 and 23). Finally, as will be described in more detail below, the conduit 152 may be pivoted on the pin 162 according to user's needs. The conduit 152 is secured in position or loosened for adjustment by means of a nut 166 threaded on the pin 162 or any standard means known in the art.

If desired, the conduit may be covered with a colored or opaque band 170, 172, 174. With or without bands, one may apply calibration to the conduit 152 as a reference for the strength of the air flow. The location of the band depends on the orientation of the conduit 152 and the indication desired. Often calibration of the conduit 152 occurs during installation. For example, the installer normally takes readings with a hot wire anemometer to measure the air velocity or a pressure instrument to measure pressure and marks or orients the conduit 152 as desired.

The orientation of the conduit depends on the apparatus being monitored. The apparatuses, however, fall into two basic categories—exhaust system (negative pressure) or air supply (positive pressure). Examples of enclosures under negative pressure are ducts, fume hoods and biohoods. Examples of enclosures under positive pressure are ducts, clean air hoods, and biohoods. Many other examples of negative or positive pressure areas exist and should be obvious to one of skill in the art.

Figure 24:
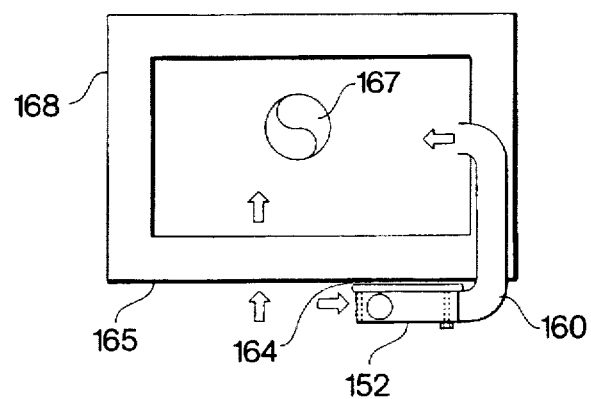
FIG. 24 is a top plan view taken along the line 24—24 of FIG. 23.

For illustrative purposes only, the embodiment is shown secured to a duct 167 of a fume cabinet 168 in FIG. 22, and directly into the fume cabinet 168 in FIGS. 23 and 24. For fume cabinet 168 monitoring in FIGS. 23 and 24, the most important measurement is usually the face velocity—that is, the velocity at which air is drawn into the fume cabinet 168 at the sash or window 169. For FIG. 22, the status of the exhaust system serving the cabinet is important.

In the fume hood monitoring system, the extension 160 may measure 3 to 4 feet in length, wherein the extension 160 in the exhaust duct monitoring arrangement may measure 4 to 5 feet in length.

In FIGS. 19–21, the conduit 152 is tilted upward, that is, the conduit 152 is pivoted at pin 162 so that the end 175 distal from the pin 162 is higher than the end 176 proximal to the pin 162. The level line is shown by dotted line 179. The end 175 is at least partially obstructed by any number of means including a stop pin 178 to prevent the sphere 150 from rolling out.

The version of FIG. 19 is primarily designed to indicate that a positive pressure system 154 is properly functioning. The sphere 150 shown has been forced proximal to the higher end 175 by positive flowing air from the supply source 154. In this system, the sphere 150 may be colored green or labeled "good" as an indicator that the system 154 is functioning properly. If the system 154 fails, the sphere 150 will roll into the opaque covered section 170 of the conduit 152 and not be visible.

The version of FIG. 20 is primarily designed to indicate that a positive pressure system 154 has failed. The sphere 150 shown has rolled toward the end 176 proximal to the pin 162 since the outward flow of air could not maintain the sphere 150 in a position in the conduit 152 hidden by the opaque area 172. In this system, the sphere 150 may be colored red or labeled "bad" as an indicator that the system 154 is not functioning properly.

While not specifically illustrated, the structure shown in FIG. 19 would be illustrative of a failed negative pressure apparatus 154 if the conduit 152 were tilted in the opposite direction. In other words, if the end 175 were lower than end 176, a visible sphere 150 would indicate that the negative pressure apparatus 154 would have failed. In this version, the sphere 150 could be red or labeled "bad".

Similarly, while not specifically illustrated, the structure shown in FIG. 20 would be illustrative of a properly functioning negative pressure apparatus 154 if the conduit were tilted so that end 175 were lower than end 176. A visible sphere 150 would indicate that the negative pressure apparatus 154 was properly working. The sphere 150 could be appropriately colored or labeled.

FIG. 21 illustrates a two sphere system. In this version, an intermediate pin 180 separates a pair of spheres 182 and 184. The functioning of this version should be obvious. A positive pressure apparatus 154 is shown and the conduit 152 is shown tilted upward. If the apparatus 154 is properly functioning, then the sphere 182, which may be appropriately marked, would be visible while the sphere 184, which may be red or "bad", would be hidden by the opaque area 174.

If the structure of FIG. 21 were used in the negative pressure apparatus 154, then the conduit 152 would preferably be tilted in the direction opposite to that shown and the spheres 182 and 184 should be recolored or relabeled appropriately.

It should be obvious that the system described with respect to FIGS. 19–24, may be easily adapted for use with several other components described throughout this specification. For example, any of the several covers or caps which may be used on the open end of the conduit 152. In addition, the optical sensors may be used in these embodiments to signal visually or audibly the safe or failed state of the apparatus being monitored.

It should further be obvious that the system described with respect to FIGS. 19–24 may also be used for monitoring the differential between two apparatuses. For example, a second extension tube, similar to the extension 160, may be secured to the open end 175. The second extension may lead to another apparatus. The differential in the air direction or pressure is thereby measured. Such an arrangement is useful when monitoring the air flow to or from or across such devices as air filters. If the filter is dirty, the sphere will roll to a position signaling that the filter must be changed.

Having thus described several embodiments of the present invention, various alterations, modifications and improvements will readily occur to those skilled in the art. Such alterations, modifications and improvements as are made obvious by this disclosure are intended to be part of this disclosure though not expressly stated herein, and are intended to be within the spirit and scope of the invention. For example, the circuitry disclosed may be readily replaced with Matsushita MP-PC for the power supply and Matsushita SIX for the time delay relay. Accordingly, the foregoing descriptions are intended to be exemplary only and not limiting. The invention is limited only as defined in the following claims and equivalents thereto.

What is claimed is:

1. An apparatus for detecting the flow direction of a fluid, comprising:
   a conduit having an inlet/outlet opening at each end and adapted to receive a fluid moving in either direction;
   at least one detecting element observable by a user disposed within the conduit and movable in the direction of a fluid flow, so that the detecting element signals which direction said fluid is flowing.

2. The apparatus as set forth in claim 1, wherein said detecting element comprises a sphere.

3. The apparatus as set forth in claim 2, further including an alarm adapted to be set off by at least one location of said sphere.

4. The apparatus as set forth in claim 1, wherein the detecting element is a flap pivotably coupled to an interior surface of said conduit and movable in the direction of fluid flow.

5. The apparatus as set forth in claim 4, further including an alarm adapted to be set off by at least one location of said flap.

6. An apparatus for detecting the flow direction of a fluid, comprising:
   a conduit having an inlet/outlet opening at each end and adapted to receive a fluid moving in either direction;
   at least one detecting element disposed within the conduit and movable in the direction of a fluid flow, so that the detecting element signals which direction said fluid is flowing; and
   wherein said detecting element comprises two spheres.

7. An apparatus for detecting the flow direction of a fluid, comprising:

a conduit having an inlet/outlet opening at each end and adapted to receive a fluid moving in either direction;

at least one detecting element disposed within the conduit and movable in the direction of a fluid flow, so that the detecting element signals which direction said fluid is flowing; and wherein said conduit is curved.

8. The apparatus as set forth in claim 7, wherein said conduit is tilted.

9. The apparatus as set forth in claim 7, wherein said detecting element comprises two spheres.

10. The apparatus as set forth in claim 8, wherein said detecting element comprises two spheres.

* * * * *